C. H. MILLER.
BALL BEARING.
APPLICATION FILED NOV. 23, 1916.
1,265,230.
Patented May 7, 1918.
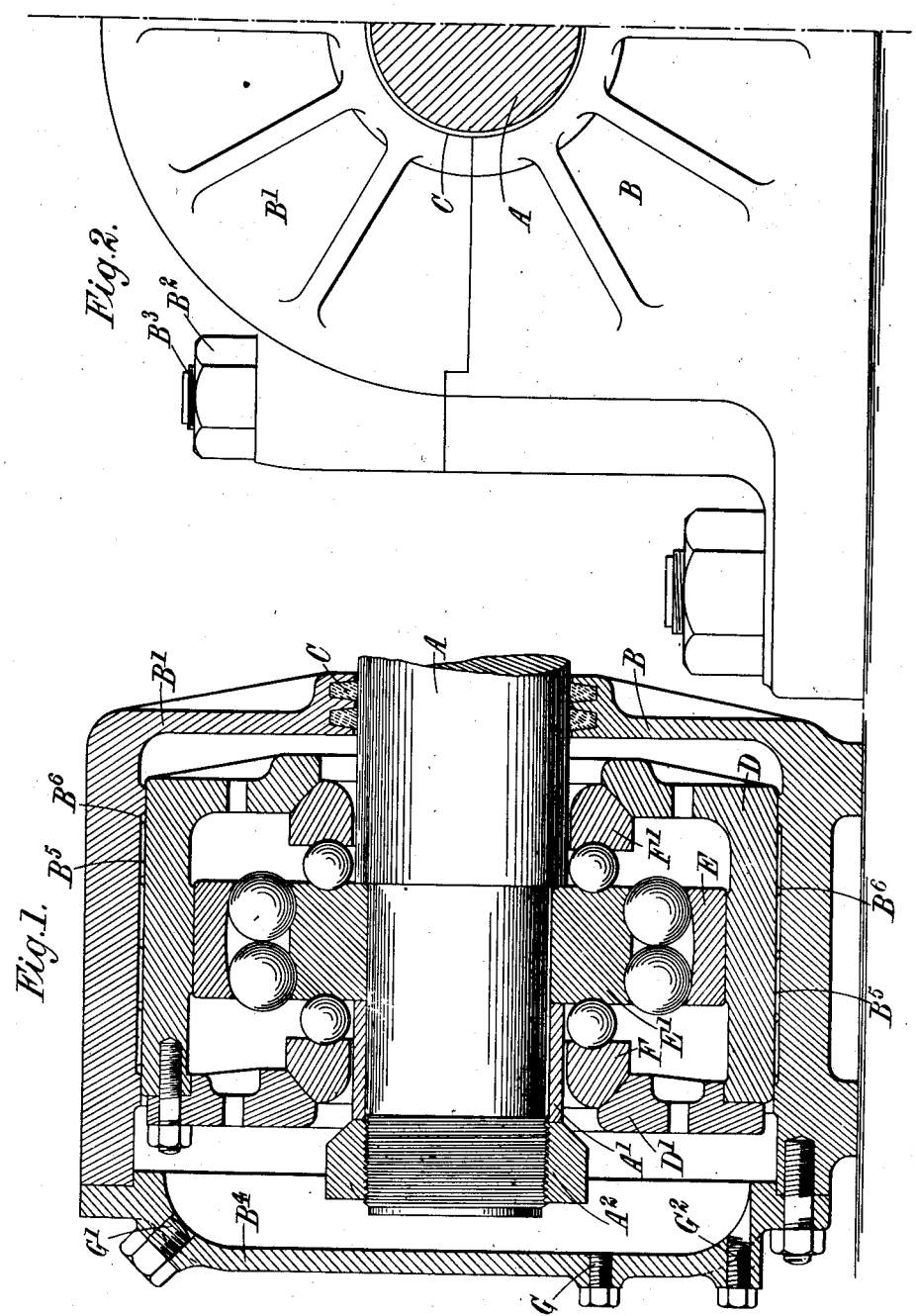
Inventor:
Clarence Hopkins Miller
By Attorneys
Fraser, Turk & Myers

UNITED STATES PATENT OFFICE.

CLARENCE HOPKINS MILLER, OF COUNTY OF BEDFORD, ENGLAND, ASSIGNOR TO AKTIEBOLAGET SVENSKA KULLAGER-FABRIKEN, OF GOTTENBORG, SWEDEN.

BALL-BEARING.

1,265,230.  Specification of Letters Patent.  Patented May 7, 1918.

Application filed November 23, 1916. Serial No. 133,091.

*To all whom it may concern:*

Be it known that I, CLARENCE HOPKINS MILLER, a subject of the King of England, residing in the county of Bedford, England, have invented certain new and useful Improvements in Ball-Bearings, of which the following is a specification.

This invention is for improvements in or connected with ball-bearings and has for its object to provide a mounting for a journal ball-bearing which will allow the bearing, as a whole, to move endwise or axially in either direction, to take up variations in length of the shaft which is supported without straining the ball-bearing itself.

This invention is applied to a mounting for a ball-bearing of the type in which the outer race-ring (or a casing containing it) can slide axially relatively to a fixed housing, the axial thrust arising in moving the bearing axially being transmitted from the shaft to the member carrying the ball-bearing without passing through the balls and ball races of the ball-bearing, the latter being constructed to carry radial load chiefly. In the illustration the construction and arrangement of the parts having relative axial movement, is such that the edges at the front and rear of one part in the direction of movement, meet or overlap the corresponding edges of the other part at the ends of the relative movement of the parts. This construction and arrangement insures that the wear caused by the relative axial movement is evenly distributed over the rubbing surfaces, so that the parts, or either of them, are not worn into a hollow, leaving a shoulder at the end of the normal travel which would prevent a travel at any time in excess of the normal amount. When such a shoulder is formed, and the ball-bearing cannot move axially to the full extent that is required, the bearing is either seriously damaged or broken altogether, and it is the object of this invention to prevent such an occurrence.

In the accompanying drawings—

Figure 1 is a central vertical section of a preferred construction of mounting; and Fig. 2 is an end view of Fig. 1.

Like reference characters denote like parts throughout the drawings.

Referring to the construction illustrated, the shaft which is to be supported by a ball-bearing and which is subjected to small endwise movements, is indicated at A. The fixed housing, in which the bearing is mounted, is indicated at B, and it is provided with a detachable upper half or cap $B^1$ in the same way as an ordinary plumber-block. This cap is held in place by nuts $B^2$ on bolts $B^3$ also in the usual manner. One end of the housing B $B^1$ is closed except for a central orifice through which the shaft A passes and a suitable oil-tight packing C is provided around the shaft. The other end of the housing is closed by an end-plate or door $B^4$ which is bolted on to the parts $B^1$ $B^2$ and provides for the easy assembling of the complete mounting. On the inner surface of the housing B $B^1$ a cylindrical bearing-surface $B^5$ is provided, and oil-grooves $B^6$, which may extend circumferentially and lengthwise on the surface, are formed to insure a supply of lubricant to the surface.

Within the housing B $B^1$ there is mounted a second or inner housing D which is a sliding fit on the surface $B^5$ so that the inner housing D can move endwise in the outer housing B $B^1$. The axial length of the seating $B^5$ is determined by the normal amount of travel the housing D is required to make in both directions, for it is made of such length that the edges of the housing D meet or overlap slightly the edges of the seating $B^5$ at each end of the travel of the housing; the housing is thus prevented from cutting into the surface $B^5$ in its normal movements to such an extent as to preclude the possibility of a movement greater than the normal amount if required.

This inner housing D has mounted in it the outer race-ring E of a radial ball-bearing, the inner ring $E^1$ being mounted on the shaft A in the usual manner. The housing D is also arranged to carry a race-ring F for a thrust-bearing, so that the thrust required for moving the housing D on its seating $B^5$ is not transmitted through the rings $E^1$ E. In the form illustrated, a double thrust-bearing and a self-alining radial bearing are used as a complete unit, the ring $E^1$ serving as the inner race-ring for the radial bearing and also as a race-ring for each of two thrust-bearings, whose other races are shown at F and $F^1$ respectively. The rings F $F^1$ are carried on inwardly directed flanges, bearing on a surface on the flanges which is made spherical about the center point of the radial bearing. The whole system is therefore self-alining. One end of the inner housing D is made detachable as at D¹ to provide for the insertion of the race-rings. The ring E¹ is held in position against a shoulder on the shaft A by a distance-piece A¹ and a nut A² screwed on the end of the shaft in the usual manner. The housing B may be made oil-tight, so that the whole bearing can run in oil, and a plug for testing the level of the oil is indicated at G. Additional plugs are indicated at G¹ and G² for filling in the oil, and for draining it from the housing when required respectively.

It is to be understood that the embodiment of the invention shown in the drawing is an illustrative example and that changes may be made, as occasion demands, within the scope of the claims without departing from the spirit of the invention.

What I claim as my invention and desire to secure by Letters Patent is:—

1. In a mounting for a ball bearing to provide for axial movement of the bearing without straining the ball bearing itself, the combination of a ball bearing, a member carrying the said ball bearing, means for transmitting the axial thrust from the shaft to the said member, and a housing wherein said member is free to move axially.

2. In a mounting for a ball bearing to provide for axial movement of the bearing without straining the ball bearing itself, the combination of a ball bearing, a member carrying the said ball bearing, means for transmitting the axial thrust from the shaft to the said member so proportioned that the edges at the front and rear of one surface in an axial direction meet or overlap the corresponding edges of the other surface at the ends of the relative movement of the said member and fixed housing.

3. In a mounting for a ball bearing to provide for axial movement of the bearing without straining the ball bearing itself, the combination of a ball bearing, a member carrying the said ball bearing, means for transmitting the axial thrust from the shaft to the said member, a housing wherein said member is free to move axially, and coöperating bearing surfaces on said housing and said member provided with lubricating grooves and so proportioned that the edges at the front and rear of one surface in an axial direction meet or overlap the corresponding edges of the other surface at the ends of the relative movement of the said member and fixed housing.

4. In a mounting for a combined radial and axial thrust ball-bearing to provide for axial movement of the bearing, the combination of an inner race-ring, a series of balls disposed radially on said ring, two series of balls disposed axially on said ring, an outer race-ring engaging the radial series of balls, axial race-rings engaging each of said axial series of balls, an inner housing receiving said outer race-ring and said axial race-rings in such manner that they cannot move relatively to it, an outer housing wherein said inner housing is free to move axially of the bearing, coöperating bearing surfaces on said outer housing and on said inner housing so proportioned that the edges at the front and rear of one surface in an axial direction meet or overlap the corresponding edges of the other surface at the ends of the relative movements of the two housings.

5 In a mounting for a ball bearing to provide for axial movement of the bearing without straining the ball bearing itself, the combination of a ball bearing, a member carrying the said ball bearing, means for transmitting the axial thrust from the shaft to the said member so proportioned that the edges at the front and rear of one surface in an axial direction meet or overlap the corresponding edges of the other surface at the ends of the relative movement of the said member and fixed housing, one of said surfaces being provided with transverse and longitudinal lubricating grooves.

In testimony whereof I have signed my name to this specification.

CLARENCE HOPKINS MILLER.